United States Patent
Houston et al.

(10) Patent No.: US 7,243,057 B2
(45) Date of Patent: Jul. 10, 2007

(54) METHOD FOR MODELING COMPLEX OCCLUSIONS IN FLUID SIMULATIONS

(75) Inventors: Benjamin B. Houston, Winnipeg (CA); Mark Wiebe, Winnipeg (CA)

(73) Assignee: Frantic Films Corporation, Winnipeg (CA)

( * ) Notice: Subject to any disclaimer, the term of this patent is extended or adjusted under 35 U.S.C. 154(b) by 431 days.

(21) Appl. No.: 10/798,898

(22) Filed: Mar. 12, 2004

(65) Prior Publication Data

US 2005/0240384 A1 Oct. 27, 2005

Related U.S. Application Data

(60) Provisional application No. 60/453,482, filed on Dec. 12, 2003.

(51) Int. Cl.
*G06G 7/48* (2006.01)
*G06F 17/10* (2006.01)

(52) U.S. Cl. ............................................. 703/9; 703/2

(58) Field of Classification Search ................ 703/2, 703/9; 702/50; 345/473, 419; 600/407
See application file for complete search history.

(56) References Cited

U.S. PATENT DOCUMENTS

| 5,801,969 | A * | 9/1998 | Nagahama ...................... 703/9 |
| 6,266,071 | B1 * | 7/2001 | Stam et al. ................... 345/473 |
| 7,098,907 | B2 * | 8/2006 | Houston et al. ............ 345/419 |
| 2003/0060988 | A1 * | 3/2003 | Ginzburg ..................... 702/50 |
| 2005/0165289 | A1 * | 7/2005 | Houston et al. ............ 600/407 |

OTHER PUBLICATIONS

Livnat et al., Y. A Near Optimal Isosurface Extraction Algorithm Using the Span Space, IEEE Transactions on Visualization and Computer Graphics, vol. 2, No. 1, Mar. 1996, pp. 73-84.*
Scheuermann et al., G. A Tetrahedra-Based Stream Surface Algorithm, IEEE, Visualization, Oct. 2001,pp. 151-158.*
Liu et al., Y. Fluid Mechanics and Mass Transport Analysis in Stenosed Carotid Arteries, Proceedings of the EMBS/BMES Conference, Oct. 2002, pp. 1309-1310.*
Liaw et al., B.Y., Numerical Simulation of Coupled Electrochemical and Transport Processes in Battery Systems, Proceedings of the 32nd Intersociety Energy Conversion Engineering Conference, Jul.-Aug. 1997, pp. 899-903.*

* cited by examiner

*Primary Examiner*—Russell Frejd
(74) *Attorney, Agent, or Firm*—Ryan W. Dupuis; Michael R. Williams; Adrian D. Battison

(57) ABSTRACT

A method of incorporating effects of solid dynamic objects into each discrete time step of a fluid simulation in a high quality fashion on Cartesian grids. The method relies on modifying the fluid velocity field within regions internal to the solid objects prior to the calculation of advection and pressure effects such that the sub voxel details of the solid objects are accurately represented. The modification of the velocities is based on allowing maximal freedom of fluid movement under the constraints the occlusions impose. Additionally, the solid objects are optionally represented in a unified level set fashion such that the computations required for modifying the fluid velocity are efficient. The overall result of this improved method rivals the quality of that achieved with the more complex curvilinear grid approach.

9 Claims, 4 Drawing Sheets

METHOD FOR MODELING COMPLEX OCCLUSIONS IN FLUID SIMULATIONS

This application claims the benefit under 35 U.S.C. 119 (e) of U.S. provisional application Ser. No. 60/453,482, filed Dec. 12, 2003.

FIELD OF THE INVENTION

This invention pertains to computational fluid dynamics, particularly for the purpose of generating realistic fluid animation for computer graphics.

BACKGROUND

Introduction

An occlusion is the means by which solid objects are represented within a fluid simulation. A solid object is a 3D volume that is impermeable to fluid but whose velocity and surface attributes will affect the adjacent fluid's flow via the integration of occlusion information into the fluid simulation.

This fluid simulation is applicable to voxel based fluid simulations based on finite difference methods or on finite volume methods employing the Navier-Stokes fluid simulation equations.

General Fluid Simulation

Eulerian-based fluid simulation consist at its core of two alternating steps: (1) calculate a fluid advection velocity field, which represents how the fluid should flow during a discrete time step, based on the current fluid properties and any external non-fluid influences (i.e. occlusions, gravity) via Eulerian-equations known to govern the behavior of fluid (i.e. the Navier-Stokes equation) and (2) advance the non-velocity aspects of fluid representation across the current discrete time step using the newly derived fluid advection velocity field.

Commonly, most Eulerian-based fluid flow governing equations are based on the Navier-Stokes equations (see equation 1).

$$u_t \simeq v\nabla \cdot (\nabla u) - (u \cdot \nabla)u - \frac{1}{\rho}\nabla p + g \qquad \text{Equation 1}$$

The Navier-Stokes equations used for fluid simulation can vary but in general they consist of a pressure term, a convection term, a viscosity term and an external forces term.

The pressure projection method is the most common approach to solving the incompressible Navier-Stokes fluid flow equations in the context of computational fluid dynamics. The pressure projection method involves calculating first the solution to all the components of the Navier-Stokes equation except the pressure projection term and then the effect of the pressure term is integrated as a separate step yielding the full Navier-Stokes. This procedure is outlined in detail in Stam, J. Stable Fluids. *SIGGRAPH* 1999 *Conference Proceedings.* ACM Press, and Foster, N. and Fedkiw, R. Practical Animation of Liquids. *SIGGRAPH* 2001 *Annual Conference,* 12–22, 2001.

The influences of occlusions are captured in two of the above listed terms of the Navier-Stokes equations: the external forces term and the pressure term. The external forces term captures the contact velocity of the occlusions in regards to the fluid. The pressure term captures the impermeable character of occlusions. In the pressure projection step the impermeability of occlusions is captured via the specification of von Neumann conditions on contact boundaries between occlusions and the fluid.

Existing Methods

The FIGS. 2, 3, 4 and 5 in this section are reproduced from Versteeg, H. K. & W. Malalasekera. *An Introduction to Computational Fluid Dynamics: The Finite Volume Method,* Prentice Hall. 1995.

Cartesian Grid Representation

Static Occlusions

A rough approximation to the occlusion region is achieved by denoting whole voxels as being either an occlusion or not. The resulting approximation is unable to represent any occlusion surface orientation that does not align with a voxel face. FIG. 2 below illustrates the standard why in which two quarter spheres would be approximated on a Cartesian grid.

Dynamic Occlusions

For dynamic occlusions it is necessary to update the list of voxels denoted as occlusions at each time step over the course of the simulation.

Integration into Fluid Simulation

Despite their shortcomings, blocked out occlusions on Cartesian grids have the advantage of being quite easy to integrate into the standard Navier-Stokes fluid simulation equations. The velocities within occlusion cells are set to the velocity of the occlusion prior to both the advection and the pressure calculations.

Simulation Quality

For occlusions whose surfaces did not originally align with any voxel faces the Cartesian grid approximation of the occlusion will be very poor. This is evident in FIG. 3.

Curvilinear Grids

Representation

Static Occlusions

Curvilinear grids allow for arbitrary warping of the otherwise regular grid structure. Thus when occlusions are defined by denoting their component voxels the underlying grid can be warped such that voxel faces can be forced to align with the surfaces of the original occlusions. (See FIG. 4.)

Dynamic Occlusions

In order to ensure that voxel faces align with the surfaces of dynamic occlusions it is necessary to update the warping of the curvilinear grid at each time step over the course of the simulation. Because there are many fluid properties represented on the curvilinear grid structure it is necessary to transfer this information from the previous warping to the new warping as well.

Integration into Fluid Simulation

Because of the arbitrary warping of the grid structure many calculations on curvilinear grids are significantly more difficult and time consuming than on Cartesian grids. However, because of the significant improvement in occlusion representation provided by curvilinear grids they have nonetheless become popular.

The quality in which occlusions are integrated into the fluid simulation when using curvilinear grids (FIG. 5) is significantly improved as compared to the quality produced from existing methods for Cartesian grids.

SUMMARY

According to one aspect of the present invention there is provided in a method of fluid simulation where state of a fluid comprising of velocities is updated in the presence of impermeable objects having surfaces in a given region over discrete time steps by:

dividing the region into cells comprising a regular grid and then defining a velocity field which associated a velocity vector with each cell; and recalculating the velocity field at each consecutive time step based on the state of the fluid on the previous time step and the effect of impermeable object surfaces via Navier-Stokes equations comprising calculation of advection and pressure effects;

the improvement comprising:

assigning a value to the velocity vectors, associated with the cells contained within the impermeable objects when the velocity field is used for the calculation of the advection and pressure effects, which is copied from the closest fluid containing cell; and when the value includes a normal component which would cause motion of the fluid into the object, removing the normal component.

When the impermeable objects have velocities defined on their surfaces, the method may include:

determining the relative velocity by taking the difference between the velocity from the closest fluid containing cell and the velocity from the nearest impermeable object surface; and removing the normal component which would cause motion of the fluid into the object by taking the dot product of the relative velocity with the surface normal of the nearest impermeable object surface, and when it is negative, adding to the velocity a vector which has a magnitude of the dot product times the magnitude of the velocity and points in the direction of the surface normal of the nearest impermeable object surface.

When a fluid volume including a surface defined by level set values representing the distance to the surface is advected according to the velocities, the method may include:

storing velocity data only for those cells which are inside or near the fluid volume; and storing level set values only for those cells which are near the fluid surface.

The method may further include obtaining the impermeable object surface velocities, the impermeable object surface normals; and determining whether a cell is inside or outside of the impermeable objects using the level set and velocity field as described according to the second aspect of the present invention.

The method may further include obtaining the velocity from the closest fluid cell by extrapolating the velocities from the cells just outside the impermeable object surface into the cells inside the impermeable object surface satisfying the constraint that the gradient of the extrapolated velocities along the direction of the impermeable object surface is zero.

When the impermeable objects may be deforming and includes a transformation along a path, the method may include computing the impermeable object surface velocities as the sum of the velocity caused by the transformation along the path and the velocity caused by the deforming of the object surface.

According to a second aspect of the present invention there is provided in a method of fluid simulation where state of a fluid is updated in the presence of impermeable objects having surfaces in a given region over discrete time steps by:

dividing the region into cells comprising a regular grid; and recalculating the fluid state at each consecutive time step based on the state of the fluid on the previous time step and the effect of impermeable object surfaces via Navier-Stokes equations;

the improvement comprising:

defining the impermeable objects as a level set with level set values representing the signed distance to the nearest impermeable objects surface, in conjunction with a velocity field comprising the velocities of the neareast impermeable object surface.

The method may further include:

storing level set values only for those cells which are near the impermeable object surface; and storing velocity values only for those cells which are near the impermeable object surface.

Illustrated Example

The following is an illustrated example of how the method described in this patent results in a noticeable improvement in the accuracy at which occlusions are represented in the fluid simulation.

The test scene used is illustrated in FIG. 6. This scene consists of a long rectangular tube, open on both ends, and partially obstructed by two semi-elliptical occlusions. The fluid is being forced into the tube on the left open end and out of the right thus setting up a cross flow though the tube.

FIG. 7 illustrates the resulting fluid velocities using the standard Cartesian grid method of approximating the influence of occlusion in a fluid flow. All voxels containing any portion of an occlusion have been denoted (i.e. the filled block voxels.) Additionally, the velocities in the denoted regions have been set to the velocity of the containing occlusions, which in this case is zero. In this figure the fluid velocities resulting form this poor approximation are illustrated as the blue vectors originating from each cell center. The critical artifact is the visible dampening of the fluid velocities immediately adjacent to the cells denoted as occlusions.

The method described in this filing does not block out an over estimation of the occlusion as described above but rather under estimates the occlusion slightly. The velocities of occlusions cells are not set to their respective object velocities but rather to the velocity of the nearest fluid cell constrained such that any object-inward motion is prevented.

It is convenient to calculate the resulting constrained velocity as the sum of two orthogonal components—one parallel to the occlusion normal and the other perpendicular:

$$u_\| = \begin{cases} proj_{n_o} u_f & n_o \cdot u_f \geq n_o \cdot u_o \\ proj_{n_o} u_o & \text{otherwise} \end{cases} \quad u_\perp = ortho_{n_o}(u_f(1 - 2\alpha_o) + u_o \alpha_o)$$

where $u_f$ is the velocities of the nearest fluid cell, $u_o$ is the true velocity of the occlusion, $\alpha_o$ is the occlusion slip coefficient, and $n_o$ is the surface normal of the nearest occlusions surface. The slip coefficient parameterizes the range of boundary conditions from full-slip to no-slip along the range [0,1].

This described method of preparing the occlusion velocities is used prior to the calculation of the advection and the pressure effects.

The fluid velocities resulting from using this method of accurately incorporating the occlusions into the fluid simulation is evident in FIG. 8. There is no visible dampening of the fluid velocities directly adjacent to occlusions in this FIG. (8) unlike in FIG. 7. The fluid velocities in FIG. 8 also follow closely the smooth curved surface of the occlusions.

FIG. 9 is similar to FIG. 8 except that the black occlusion regions have been removed thus exposing the red underlying velocities that have been set using the improved description above.

BRIEF DESCRIPTION OF THE FIGURES

In the accompanying drawings, which illustrate an exemplary embodiment of the present invention.

DETAILED DESCRIPTION

Figure 1:
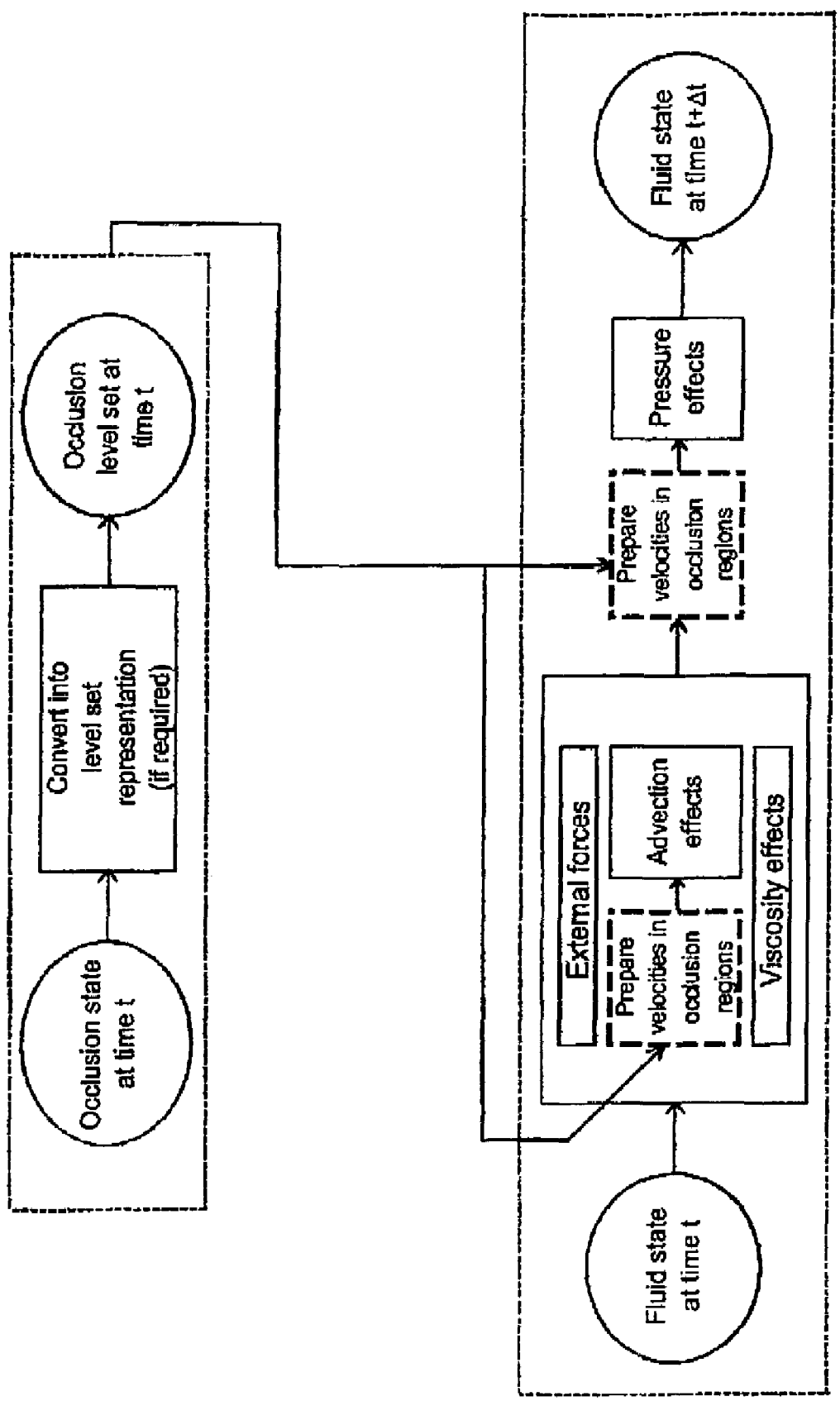
FIG. 1 is an overview of the steps of the invention process.
Figure 2:
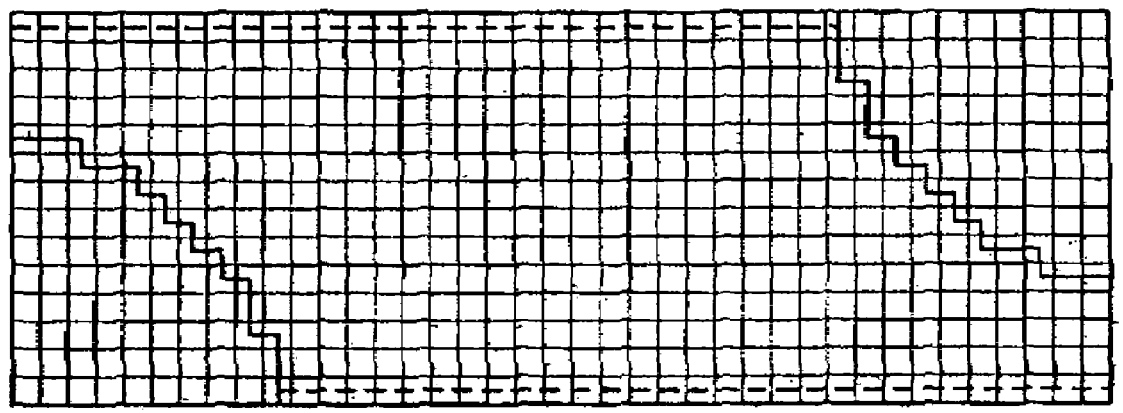
FIG. 2 illustrates delineation of occlusions boundaries on a Cartesian grid.
Figure 3:
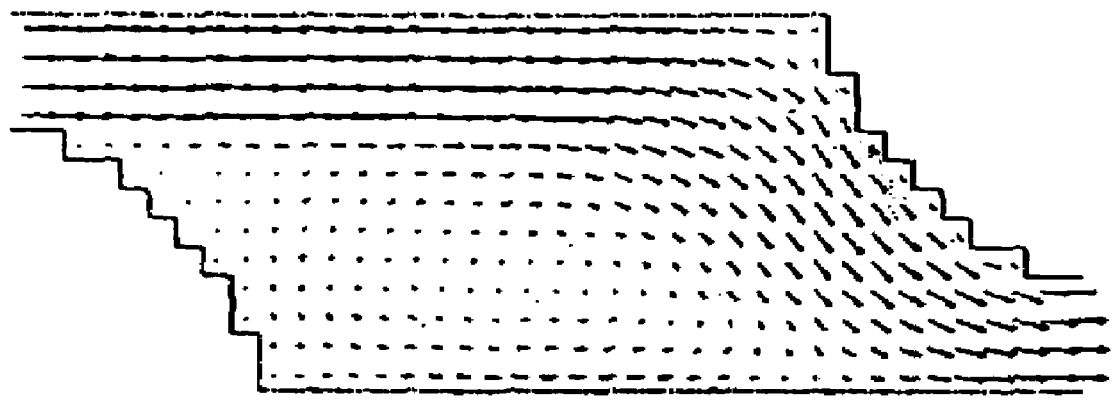
FIG. 3 illustrates fluid velocities resulting from standard Cartesian grid occlusion representations.
Figure 4:
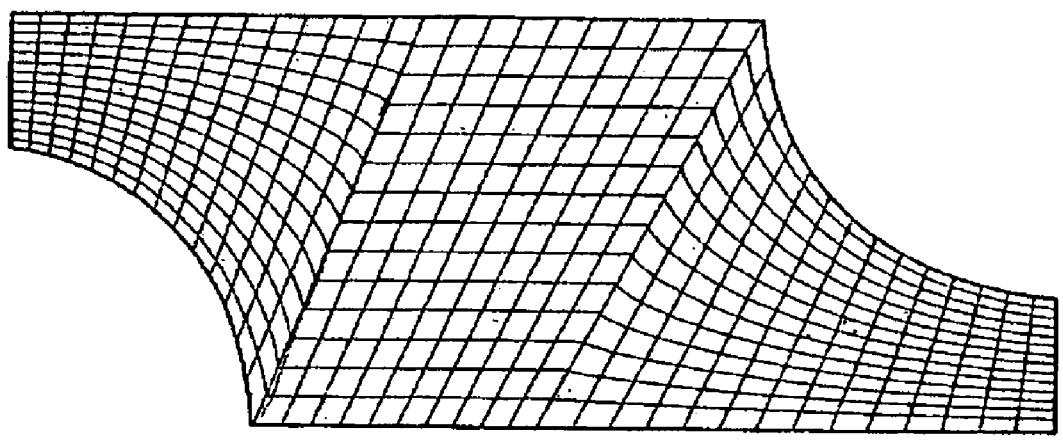
FIG. 4 illustrates a curvilinear grid that incorporations occlusions.
Figure 5:
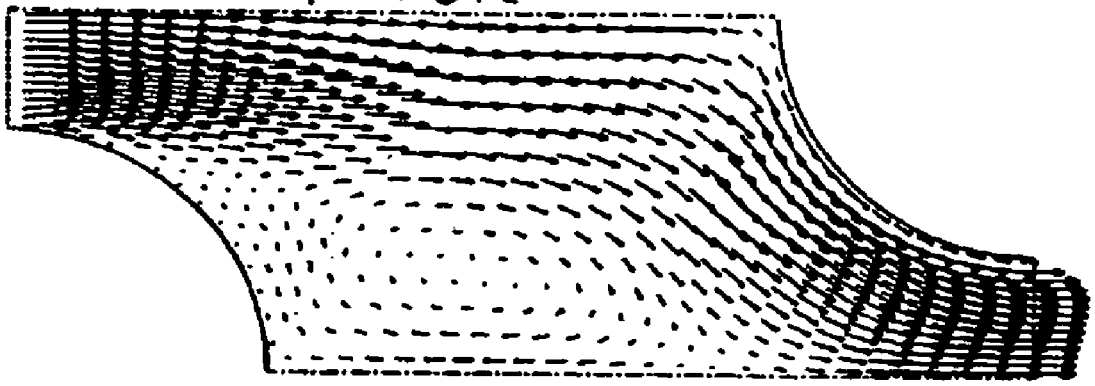
FIG. 5 illustrates fluid velocities resulting from standard curvilinear grid occlusion representations.
Figure 6:
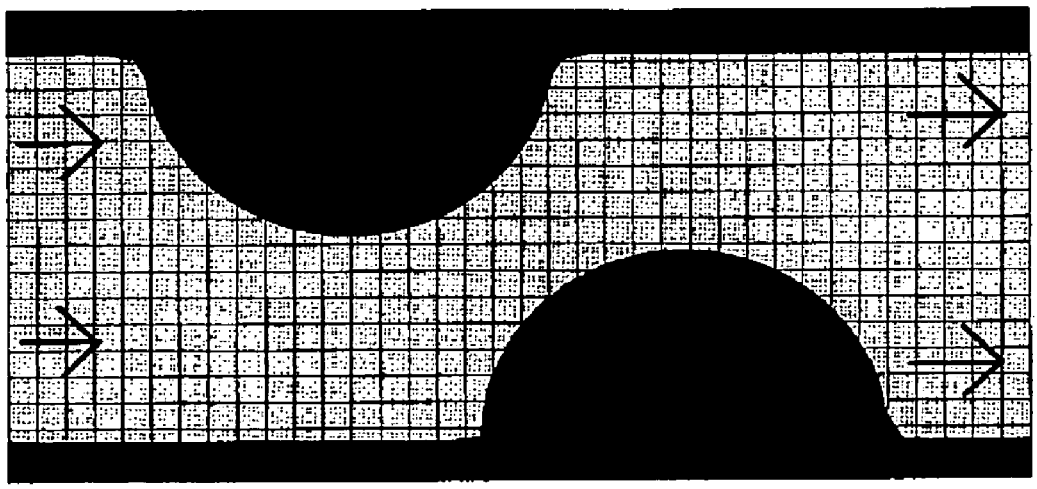
FIG. 6 details the initial scene using in the example as specified on a Cartesian grid.
Figure 7:
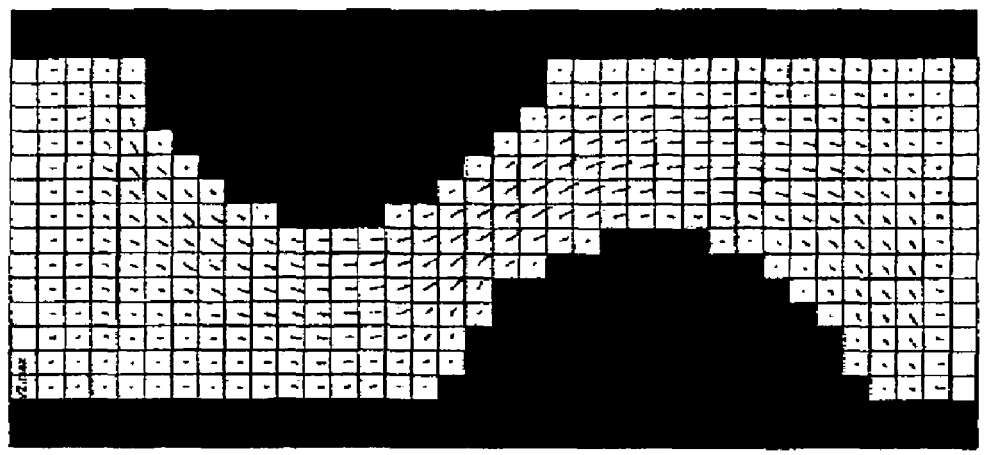
FIG. 7 illustrates fluid velocities resulting from standard Cartesian grid occlusion representations.
Figure 8:
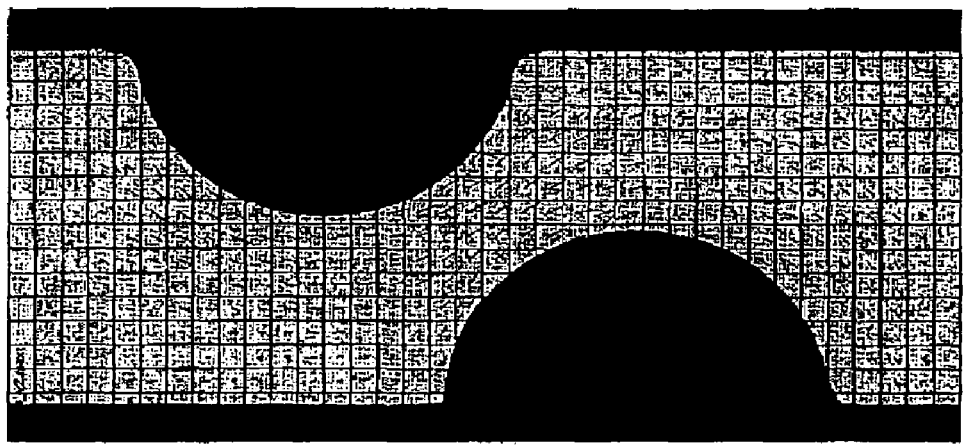
FIG. 8 illustrates fluid velocities resulting from the improved method Cartesian grid occlusion representations detailed in this document.
Figure 9:
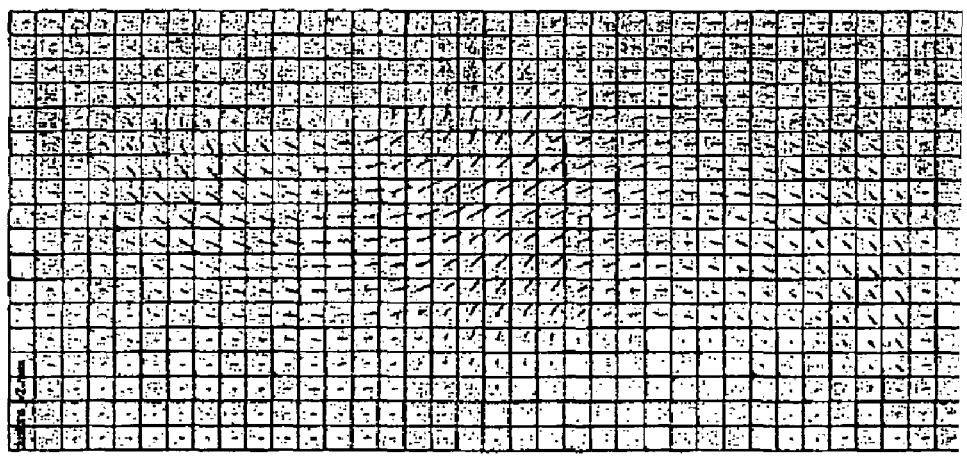
FIG. 9 illustrates how the occlusion detail is represented via the velocities interior to the occlusions (red vectors) on the Cartesian grid.

Unless defined otherwise, all technical and scientific terms used herein have the same meaning as commonly understood by one of ordinary skill in the art to which the invention belongs. Although any methods similar or equivalent to those described herein can be used in the practice of the present invention, the preferred methods are described herein. An exemplary embodiment will now be described.

Unified Occlusion Representation

In order to unify all of the occlusions affecting the simulation, we represent their geometry using a level set instead of relying on a polygon mesh directly (as was done in Foster, N. and Fedkiw, R. Practical Animation of Liquids. *SIGGRAPH* 2001 *Annual Conference,* 12–22, 2001 and Enright, D., Marschner, S. and Fedkiw, R. Animation and Rendering of Complex Water Surfaces, *ACM Trans. On Graphics* (*SIGGRAPH* 2002 *Proceedings*) 21, 736–744, 2002. A level set alone can only capture the instantaneous geometry of the occlusions, thus it cannot model the effects of the occlusion velocities and slip conditions. We store this information in two addition fields—a vector field for the velocities and a scalar field for the slip conditions. We denote the level set, occlusion velocity field, and slip condition field by the following set:

$$\psi(x)=\{\phi(x),u(x),\alpha(x)\}$$

The global occlusions representation is the union of all the individual occlusions. For our purposes the union operator is defined as:

$$\psi_{A\cup R}(x) = \begin{cases} \psi_A(x) & \text{if } \phi_A(x) \le \phi_R(x) \\ \psi_B(x) & \text{otherwise} \end{cases}$$

This union operator, since it is both associative and distributive, allows considerable flexibility in the calculation and partial caching of the global occlusions model.

Creating Occlusions Representations

The three fields that represent occlusions in our approach often need to be generated from explicit geometry representation. The following method is used to compute the set of fields for one occlusion.

Level Set

Of the three fields, the generation of the level set is the most complex. Our method, which is both efficient and robust, consists of the following steps: (1) Explicit geometry is converted into a structure that allows for efficient calculation of ray intersections. (2) Rays are cast along a number of axis directions, recording data indicating whether the center of a voxel is inside or outside, and an initial distance from the surface. This data is then resolved into a rough distance function. (3) Discontinuities near the zero-level set (which can result from imperfections such as gaps in the geometry) are removed. (4) The level set is then "smoothed" via a standard re-initialization algorithm. The generation of the level set is described in detail in prior U.S. provisional patent application No. 60/443,543, the subject matter of which is incorporated herein by reference.

Velocity Field

Our calculation of the velocity field is straightforward. Each occlusion is associated With a motion path expressible as a function mapping time t to a transformation matrix, T(t). The velocity field is obtained by taking the product of the position and the component-wise derivative of this motion path: u(x,t)=(T'(t))x.

Slip Field

We typically use a single value for the slip condition of each occlusion, so the slip field is a constant. It is also possible to define a varying slip field for the slip condition of each occlusion.

---

```
Pseudocode
ComputeUnifiedOcclusions( ) {
  Set the global occlusions level set glob_ls to be empty.
  Set the global occlusions velocity field glob_vel to be zero.
  Set the global slip condition field glob_slip to a default value.
  For(each occlusion occ in the simulation) {
    Compute a level set ls from occ
    Compute a velocity field vel from occ
    Compute a slip condition field slip from occ
    For(each point x in the grid of ls) {
      If(ls[x] < glob_ls[x]) {
        glob_ls[x] = ls[x]
        glob_vel[x] = vel[x]
        glob_slip[x] = slip[x]
      }
    }
```

-continued

```
            }
        }
    }
}
```

Incorporation into Fluid Simulation

The occlusions are relevant to two major aspects of the fluid solver, the mass conservation calculation and the advection velocity field.

Mass Conservation

Incompressibility is enforced by solving the equation $\nabla \cdot u - \nabla^2 p$ for pressure, p. During the calculation of $\nabla \cdot u$, vector occlusion velocities are used instead of fluid velocities in regions interior to the occlusions. The occlusions are incorporated into the Poisson matrix represented the Laplacian operator by omitting cells that lie completely within the occlusions, and using von Neumann boundary conditions for the remaining faces whose centers' lie within the occlusions.

Advection Velocity Field

The advection velocity field, which is used to advect both the level set and the fluid velocity field, must accurately account for the occlusions. This is achieved via our new method of constrained velocity extrapolation. This is similar to the method described in Enright, D., Marschner, S. and Fedkiw, R. Animation and Rendering of Complex Water Surfaces. *ACM Trans. On Graphics (SIGGRAPH 2002 Proceedings)* 21, 736–744, 2002 for extrapolating fluid velocities into the air, the main distinction however, besides the fact that we are extrapolating into occlusions rather than the air, is that constraints are imposed on the velocities after extrapolation. These constraints reflect the effects of three space varying aspects of the occlusions: the slip coefficient, the surface orientation, and the velocity. It is convenient to calculate the resulting constrained velocity as the sum of two orthogonal components—one parallel to the occlusion normal and the other perpendicular:

$$u_\| = \begin{cases} proj_{n_o} u_f & n_o \cdot u_f \geq n_o \cdot u_o \\ proj_{n_o} u_o & \text{otherwise} \end{cases} \quad u_\perp = ortho_{n_o}(u_f(1-2\alpha) + u_o\alpha)$$

Where $u_f$ is the unconstrained extrapolated fluid velocity, $u_o$ is the occlusion velocity, $\alpha_o$ is the occlusion slip coefficient, and $n_o$ is the normalized gradient of the occlusions level set. The slip coefficient parameterizes the range of boundary conditions from full-slip to no-slip along the range [0,1].

While one embodiment of the present invention has been described in the foregoing, it is to be understood that other embodiments are possible within the scope of the invention. The invention is to be considered limited solely by the scope of the appended Claims.

The invention claimed is:

1. A computer-implemented method of including at least one impermeable object in a fluid simulation where a state of a fluid comprised of velocities is updated in a given region over discrete time steps by:
    dividing the region into cells comprising a regular grid and then defining a velocity field which associates a velocity vector with each cell; and
    recalculating the velocity field at each consecutive time step based on the state of the fluid on the previous time step and an effect of said at least one impermeable object via Navier-Stokes equations comprising calculation of advection and pressure effects;
    the method of including said at least one impermeable object comprising:
        identifying surfaces of said at least one impermeable object in the given region to define cells contained within said at least one impermeable object and to define closest fluid containing cells within the fluid;
        assigning a value to the velocity vectors associated with the cells contained within said at least one impermeable object when the velocity field is used for the calculation of the advection and pressure effects, which is copied from the closest fluid containing cell;
        when the value includes a normal component which would cause motion of the fluid into said at least one impermeable object, removing the normal component; and
        storing the values of the velocity vectors associated with the cells contained within said at least one impermeable object with said normal components being removed therefrom.

2. The computer-implemented method according to claim 1 wherein said at least one impermeable object has velocities defined on the surfaces of said at least one impermeable object, the method including:
    determining a relative velocity by taking the difference between the velocity from the closest fluid containing cell and the velocity from a nearest surface of said at least one impermeable object; and
    removing the normal component which would cause motion of the fluid into said at least one impermeable object by taking a dot product of the relative velocity with a surface normal of a nearest impermeable object surface, and when it is negative, adding to the velocity vector, a vector which has a magnitude of the dot product times a magnitude of the velocity vector and which points in a direction of the surface normal of the nearest impermeable object surface.

3. The computer-implemented method according to claim 1 wherein a fluid volume including a fluid surface defined by level set values representing a distance to the surface is advected according to the velocity vectors, the method including:
    storing velocity data only for those cells which are inside or near the fluid volume; and
    storing level set values only for those cells which are near the fluid surface.

4. The computer-implemented method according to claim 1 including:
    defining said at least one impermeable object as a level set with level set values representing a signed distance to a nearest surface of said at least one impermeable object, in conjunction with a velocity field comprising the velocities of a nearest surface; and
    obtaining velocities of the surface of said at least one impermeable object, and normals of the surface of said at least one impermeable object; and
    determining whether a cell is inside or outside of said at least one impermeable object using the level set and the velocity field.

5. The computer-implemented method according to claim 1, including:
    obtaining the velocity vector from the closest fluid cell by extrapolating the velocity vectors from the cells just outside the surface of said at least one impermeable object into the cells inside the surface of said at least one impermeable object satisfying a constraint that the gradient of the extrapolated velocity vectors along a normal direction of the surface of said at least one impermeable object is zero.

6. The computer-implemented method according to claim 1 wherein said at least one impermeable object may be deforming and including a transformation along a path, the method including: computing the velocity vectors of the surface of said at least one impermeable object as the sum of a velocity caused by the transformation along the path and a velocity caused by the deforming of the object surface.

7. A computer-implemented method of including at least one impermeable object in a fluid simulation where a state of a fluid is updated in a given region over discrete time steps by:
dividing the region into cells comprising a regular grid; and
recalculating the fluid state at each consecutive time step based on the state of the fluid on the previous time step and an effect of said at least one impermeable object via Navier-Stokes equations;
the method of including said at least one impermeable object comprising:
identifying surfaces of said at least one impermeable object in the given region;
defining said at least one impermeable object as a level set with level set values representing a signed distance to a nearest surface of said at least one impermeable object, in conjunction with a velocity field comprising velocities of the nearest surface of said at least one impermeable object;
storing, in conjunction with the level set values representing the signed distance to the nearest surface of said at least one impermeable object, the velocities of the nearest surface of said at least one impermeable object.

8. The computer-implemented method according to claim 7 including:
storing level set values only for those cells which are near the surface of said at least one impermeable object; and
storing velocity values only for those cells which are near the surface of said at least one impermeable object.

9. In a computer-implemented method of fluid simulation where a state of a fluid is updated in the presence of impermeable objects having surfaces in a given region over discrete time steps by:
dividing the region into cells comprising a regular grid; and
recalculating the fluid state at each consecutive time step based on the state of the fluid on the previous time step and the effect of impermeable object surfaces via Navier-Stokes equations;
the improvement comprising:
defining the impermeable objects as a level set with level set values representing a signed distance to a nearest surface of the impermeable objects, in conjunction with a velocity field comprising velocities of the nearest surface of the impermeable objects;
storing level set values only for those cells which are near the surface of the impermeable objects; and
storing velocity values only for those cells which are near the surface of the impermeable objects.

* * * * *